July 20, 1965 A. R. WOOSEY ETAL 3,195,821
HIGH SPEED WINDING COLLET
Filed Sept. 27, 1963
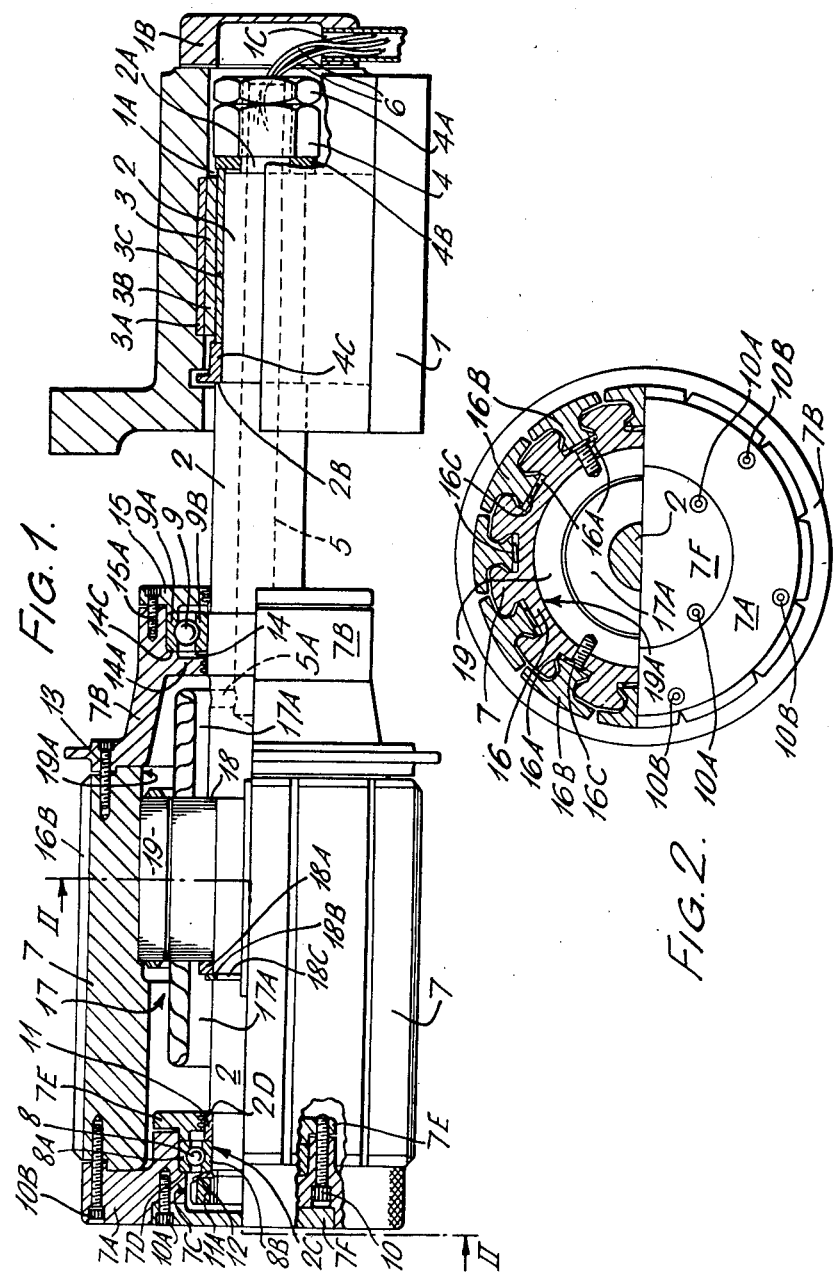
INVENTORS
ARTHUR RONALD WOOSEY and
GEOFFREY ALLAN WARREN
BY Lockwood, Woodard, Smith & Weikart
ATTORNEYS

United States Patent Office 3,195,821
Patented July 20, 1965

3,195,821
HIGH SPEED WINDING COLLET
Arthur Ronald Woosey, Prescot, and Geoffrey Allan Warren, St. Helens, England, assignors to Fibreglass Limited, St. Helens, England
Filed Sept. 27, 1963, Ser. No. 312,191
Claims priority, application Great Britain, Sept. 28, 1962, 36,843/62
4 Claims. (Cl. 242—18)

This invention relates to a high speed rotary collet, more particularly for use in packaging glass fibre filaments.

Collets for winding and attenuating glass fibre filaments at a speed in the region of 10,000 ft. per minute are known, the collets being driven by compressed air, or from an exterior source of power through a belt drive or other power transmission means. Such driving arrangements have the disadvantage that the collets in the case of compressed air drive are bulky and are costly, and in the case of a belt drive or other power transmission means maintenance is necessary. An object of this invention is to provide a rotatory collet for the high speed winding, particularly of glass filament, which largely obviates these disadvantages.

According to this invention a collet for winding filamentary material, more particularly for use in winding glass filament at high speed, incorporates an internal electric motor for driving the collet. Thus, the need for power transmission, such as a V-belt drive, is eliminated.

One embodiment of the invention will now be described by way of example, with reference to the accompanying drawings in which:

FIGURE 1 is a part side elevation and part longitudinal section; and

FIGURE 2 is a part end elevation and part transverse section, on line II—II of FIGURE 1.

Referring to the drawings, a bracket 1 has a longitudinal bore 1A to receive a stationary mounting member in the form of a shaft 2. Shaft 2 is held rigidly in bore 1A by a sleeve assembly 3, consisting of an outer sleeve 3A fixed in bracket 1, an intermediate sleeve 3B, and an inner sleeve 3C, the latter surrounding shaft 2. The inner end 2A of shaft 2 is of reduced diameter as shown and threadedly receives a clamping nut 4 and a lock nut 4A which clamp inner sleeve 3C between washers 4B and 4C, the latter abutting a shoulder 2B of shaft 2. The inner end of bore 1A is closed by a cap 1B having a radial hole 1C.

Shaft 2 has a longitudinal bore 5, open at inner end 2A of shaft 2 and extending through the shaft as far as a radial hole 5A. Electrical lead wires (partly shown at 6) extend through hole 1C, bore 5 and hole 5A, to supply an electric motor, to be described.

Shaft 2 thus extends outwardly from bracket 1 and is immovably held by it.

A collet 7 is freely rotatably mounted on shaft 2 by front and back ball bearings 8 and 9 respectively, which bearings each have inner and outer races 8A, 8B and 9A, 9B.

Collet 7 has a front cover 7A and a back cover 7B. Front cover 7A has a central core 7C with a shoulder 7D against which outer race 8A is clamped by a front bearing cover disc 7E screwed to front cover 7A by screws 10. Bore 7C is closed by a plate 7F, held on cover 7A by screws 10A. Cover 7A is held on collet 7 by screws 10B. (See also FIGURE 2.) Thus outer race 8A is rigid with collet 7. Inner race 8B is clamped on a reduced diameter outer end 2C of shaft 2, between a collar 11 and shoulder 2D on the one hand and a ring 11A fixed on the end of shaft 2 by a threaded nut 12.

Collet 7 is fixed to its back cover 7B by screws 13.

Back cover 7B has a cylindrical recess 14 formed between a flange 14A of cover 7B and a back cover plate 15 which is fixed to cover 7B by screws 15A. Recess 14 accommodates back bearing 9. Outer race 9A is clamped by cover plate 15 against a shoulder 14C of back cover 7B. Inner race 9B is a tight push fit on shaft 2.

Referring to FIGURE 2, collet 7 is of conventional construction (known in the glass fibre art) with an inner portion 16 having a series of equally spaced, axially extending dovetail slots 16A and a number of elongated outer portions 16B, each held in a slot 16A, and urged outwardly by helical springs 16C. Axial movement of elongated portions 16B is prevented by front and rear covers 7A and 7B.

In accordance with the invention, a field winding 17A of a squirrel cage induction motor generally indicated by 17 is fixed on shaft 2 by being clamped between a shoulder 18 on the one hand and an annulus 18A and spring ring 18B in a groove 19C, on the other hand. The rotor member 19 of the squirrel cage induction motor 17 is a tight fit in the inner bore 19A of collet 7 and disposed around the field winding 17A.

Electric leads 6 are connected to field winding 17A. When A.C. is applied to field winding 17A, cage 19 and collet 7 will rotate on shaft 2. Speed control of the collet is by means of a frequency control which may incorporate a tachometer pick-up and feed back. Such devices are well known and are therefore not shown. If the electrical supply frequency is kept constant, the collet speed will be kept constant. By decreasing the frequency proportionately to the rate of build-up of the glass fibre filament on the collet, the rotational speed may be reduced at a rate such that the linear speed of the filament being wound is kept constant.

To stop rotation of the collet, the A.C. supplied is stopped and replaced by a D.C. supply. This replaces the rotating magnetic field in the motor with a stationary field which acts as a brake on the rotating squirrel cage and the collet.

I claim:

1. A rotary collet device for winding filamentary material, said device comprising:
    a stationary shaft having a stepped cylindrical outer surface thereon, said shaft having a first bearing race receiving surface thereon, and said shaft having a squirrel cage electric motor field winding receiving surface thereon, said field winding receiving surface being disposed between a first shoulder and a circumferential groove in said shaft;
    a squirrel cage motor field winding received on said field winding receiving surface of said shaft and abutting said shoulder, said field winding being retained on said shaft in position by a spring ring disposed in said groove, said field winding being readily removable from said shaft upon removal of said spring ring;
    first and second anti-friction bearings having inner races received on said first and second bearing race receiving surfaces of said shaft, respectively;
    a collet having a front end cover removably secured to the front end thereof, said cover mounting the front end of said collet rotatably to said shaft by clamping to the outer race of said first bearing, said collet having a squirrel cage rotor secured in an inner bore thereof and disposed around said field winding for imparting motion to said collet when said field winding is appropriately energized, and said collet having a back cover removably secured thereto and clamped to the outer race of said second bearing for mounting the back end of said collet rotatably to said shaft, said front cover and said first bearing being readily removable from said collet and said shaft and facilitating removal of said field winding from said shaft while said collet and said back cover remain in position on said shaft.

2. The combination as set forth in claim 1 and further comprising:

a stationary mounting bracket having a bore extending therethrough;

a sleeve assembly received in the bore of said mounting bracket and encircling an end portion of said shaft;

a nut threadedly received on the end of said shaft at said bracket, a portion of said sleeve assembly being disposed between said nut and a shoulder on said shaft whereby tightening of said nut affixes said shaft between said sleeve and said mounting bracket to affix said shaft to said mounting bracket.

3. A device as set forth in claim 2 and further comprising;

a longitudinal bore extending through said end portion of said shaft and opening at said end of said shaft at said mounting bracket;

and motor field winding leads extending from said field winding through said bore and out the end of said shaft through said nut for applying energy to said field winding from a remote source.

4. A rotary collet device for winding filamentary material, said device comprising;

a stationary shaft having a first bearing receiving surface thereon and a second bearing receiving surface thereon, and said shaft having an electric motor field winding receiving surface thereon, said field winding receiving surface being disposed between a first shoulder and a first retainer means on said shaft;

a motor field winding received on said field winding receiving surface of said shaft and abutting said shoulder, said field winding being retained on said shaft in position by said first retainer means, said first retainer means being easily releasable whereby said field winding is readily removable from said shaft upon release of said first retainer means;

first and second bearings received on said first and second bearing receiving surfaces of said shaft, respectively;

a collet having a front end cover removably secured to the front end thereof, said cover mounting the front end of said collet rotatably to said shaft through said first bearing, the rear end of said collet being rotatably mounted to said shaft through said second bearing, said collet having a squirrel cage rotor member secured in an inner bore thereof and disposed around said field winding for imparting motion to said collet when said field winding is appropriately energized, said front cover and said first bearing being readily removable from said collet and said shaft and facilitating removal of said field winding from said shaft while said collet remains in position on said shaft.

References Cited by the Examiner
UNITED STATES PATENTS

| | | | |
|---|---|---|---|
| 1,994,403 | 3/35 | Reiners et al. | 242—18 |
| 2,116,410 | 5/38 | Parks | 242—18 |
| 2,459,064 | 1/49 | Davis. | |
| 2,509,250 | 5/50 | Roberts | 242—45 |
| 2,571,023 | 10/51 | Ertner | 242—45 |
| 2,594,427 | 4/52 | Haase | 242—45 |
| 2,891,798 | 6/59 | Smith. | |
| 2,950,067 | 8/60 | Keith | 242—45 X |
| 3,054,569 | 9/62 | Weber et al. | 242—45 |

MERVIN STEIN, *Primary Examiner.*